US006834871B2

(12) United States Patent
Chen et al.

(10) Patent No.: US 6,834,871 B2
(45) Date of Patent: Dec. 28, 2004

(54) FULL-FUNCTION MODULARIZED ASSEMBLY STRUCTURE OF A WHEELCHAIR

(75) Inventors: Zen-Jye Chen, Taichung (TW); Hsiang-Suen Lin, Taichung (TW); Wen-Huei Chung, Taichung (TW); Shsu-Tung Chu, Taichung (TW); Chi-Ming Shih, Taichung (TW); Ju-Pin Li, Taichung (TW)

(73) Assignee: Aerospace Industrial Development Corporation, Taichung (TW)

( * ) Notice: Subject to any disclaimer, the term of this patent is extended or adjusted under 35 U.S.C. 154(b) by 159 days.

(21) Appl. No.: 10/205,467

(22) Filed: Jul. 26, 2002

(65) Prior Publication Data

US 2003/0189304 A1 Oct. 9, 2003

(30) Foreign Application Priority Data

Apr. 3, 2002 (TW) ..................................... 91204459 U

(51) Int. Cl.[7] ................................................. B62B 7/00
(52) U.S. Cl. .................................. 280/47.34; 280/304.1
(58) Field of Search ........................... 280/47.38, 250.1, 280/304.1; 297/DIG. 4, 452.2

(56) References Cited

U.S. PATENT DOCUMENTS

| | | | | | |
|---|---|---|---|---|---|
| 4,648,619 | A | * | 3/1987 | Jungnell et al. | 280/650 |
| 4,721,321 | A | * | 1/1988 | Haury et al. | 280/250.1 |
| 5,290,055 | A | * | 3/1994 | Treat, Jr. | 280/304.1 |
| 5,328,183 | A | * | 7/1994 | Counts | 280/42 |
| 5,419,571 | A | * | 5/1995 | Vaughan | 280/250.1 |
| 5,516,226 | A | * | 5/1996 | Wu | 403/403 |
| 6,296,265 | B1 | * | 10/2001 | Lovins | 280/250.1 |
| 6,338,496 | B1 | * | 1/2002 | O'Neill, Sr. | 280/250.1 |
| 6,345,833 | B2 | * | 2/2002 | Melgarejo et al. | 280/250.1 |
| 6,394,476 | B1 | * | 5/2002 | Molnar | 280/250.1 |
| 6,499,756 | B2 | * | 12/2002 | Amirola | 280/304.1 |
| 6,499,762 | B1 | * | 12/2002 | Rogers et al. | 280/650 |
| 6,648,359 | B2 | * | 11/2003 | Chen et al. | 280/304.1 |
| 2004/0070164 | A1 | * | 4/2004 | Walsh et al. | 280/250.1 |
| 2004/0155429 | A1 | * | 8/2004 | Knopf et al. | 280/250.1 |

FOREIGN PATENT DOCUMENTS

| | | | |
|---|---|---|---|
| DE | 3742547 | * | 6/1989 |
| GB | 2101540 | * | 1/1983 |

* cited by examiner

*Primary Examiner*—Bryan Fischmann
(74) *Attorney, Agent, or Firm*—Rosenberg, Klein & Lee

(57) ABSTRACT

A modularized assembly structure of a wheelchair includes two upper transverse tubes and two lower transverse tubes mounted between a pair of sided front module connecting members and a pair of sided rear module connecting members, thereby forming the main frame of the wheelchair. The front wheel and the rear wheel may be respectively mounted on the upper and lower transverse tubes which may be set at different horizontal positions and different vertical heights, so that the distance between the front wheel and the rear wheel may be adjusted arbitrarily.

6 Claims, 14 Drawing Sheets

FULL-FUNCTION MODULARIZED ASSEMBLY STRUCTURE OF A WHEELCHAIR

BACKGROUND OF THE INVENTION

1. Field of the Invention

The present invention relates to a full-function modularized assembly structure of a wheelchair, and more particularly to a full-function modularized assembly structure of a wheelchair, wherein the full-function modularized assembly structure has a simple construction, and may be produced in a modularized manner, thereby efficiently decreasing costs of fabrication.

2. Description of the Related Art

A conventional wheelchair comprises a main frame which is provided with a front wheel set, a rear wheel set, a soft seat cushion, a foot plate, and a push bar, thereby constructing the wheelchair. In general, when the distance between the rear wheel set and the front wheel set is longer, the stability of the wheelchair may be enhanced, and when the distance between the rear wheel set and the front wheel set is shortened, the user may operate the rear wheel set to travel forward easily and conveniently. However, the main frame has a fixed structure, so that the distance between the front wheel set and the rear wheel set cannot be adjusted, thereby decreasing the stability and operation of the wheelchair. In addition, the main frame has a fixed structure, so that the wheelchair is available for the user of a single size, and cannot be available for users of different sizes and statures, thereby decreasing the versatility of the wheelchair.

SUMMARY OF THE INVENTION

The primary objective of the present invention is to provide a full-function modularized assembly structure of a wheelchair, wherein the sided front module connecting members and the sided rear module connecting members may mate with the upper transverse tubes and the lower transverse tubes of different sizes and types according to the user's practical requirements, thereby constructing wheelchairs of different sizes and specifications.

Another objective of the present invention is to provide a full-function modularized assembly structure of a wheelchair, wherein the rear wheel axle of each of the rear wheels may be located at different horizontal positions, so that the distance between the rear wheel and the front wheel may be changed and adjusted arbitrarily, wherein the distance between the rear wheel and the front wheel may be increased for enhancing the stability of the wheelchair, and the distance between the rear wheel and the front wheel may be shortened, thereby facilitating the user operating the rear wheel to travel forward.

A further objective of the present invention is to provide a full-function modularized assembly structure of a wheelchair, wherein the rear wheel axle of each of the rear wheels may be located at different vertical heights, so that the present invention is available for wheelchairs of different sizes.

A further objective of the present invention is to provide a full-function modularized assembly structure of a wheelchair, wherein the full-function modularized assembly structure has a simple construction, and may be produced in a modularized manner, thereby efficiently decreasing costs of fabrication.

In accordance with the present invention, there is provided a full-function modularized assembly structure of a wheelchair, comprising:

a pair of sided front module connecting members each including a first insertion connector for insertion of an upper transverse tube, a second insertion connector for insertion of a lower transverse tube, and at least one front wheel locating screw bore for locating a front wheel; and a pair of sided rear module connecting members each including a fourth insertion connector corresponding to the first insertion connector for insertion of the upper transverse tube, a fifth insertion connector corresponding to the second insertion connector for insertion of a lower transverse tube, and at least one rear wheel axle insertion hole for insertion of a rear wheel axle.

Further benefits and advantages of the present invention will become apparent after a careful reading of the detailed description with appropriate reference to the accompanying drawings.

DETAILED DESCRIPTION OF THE INVENTION

Figure 1:
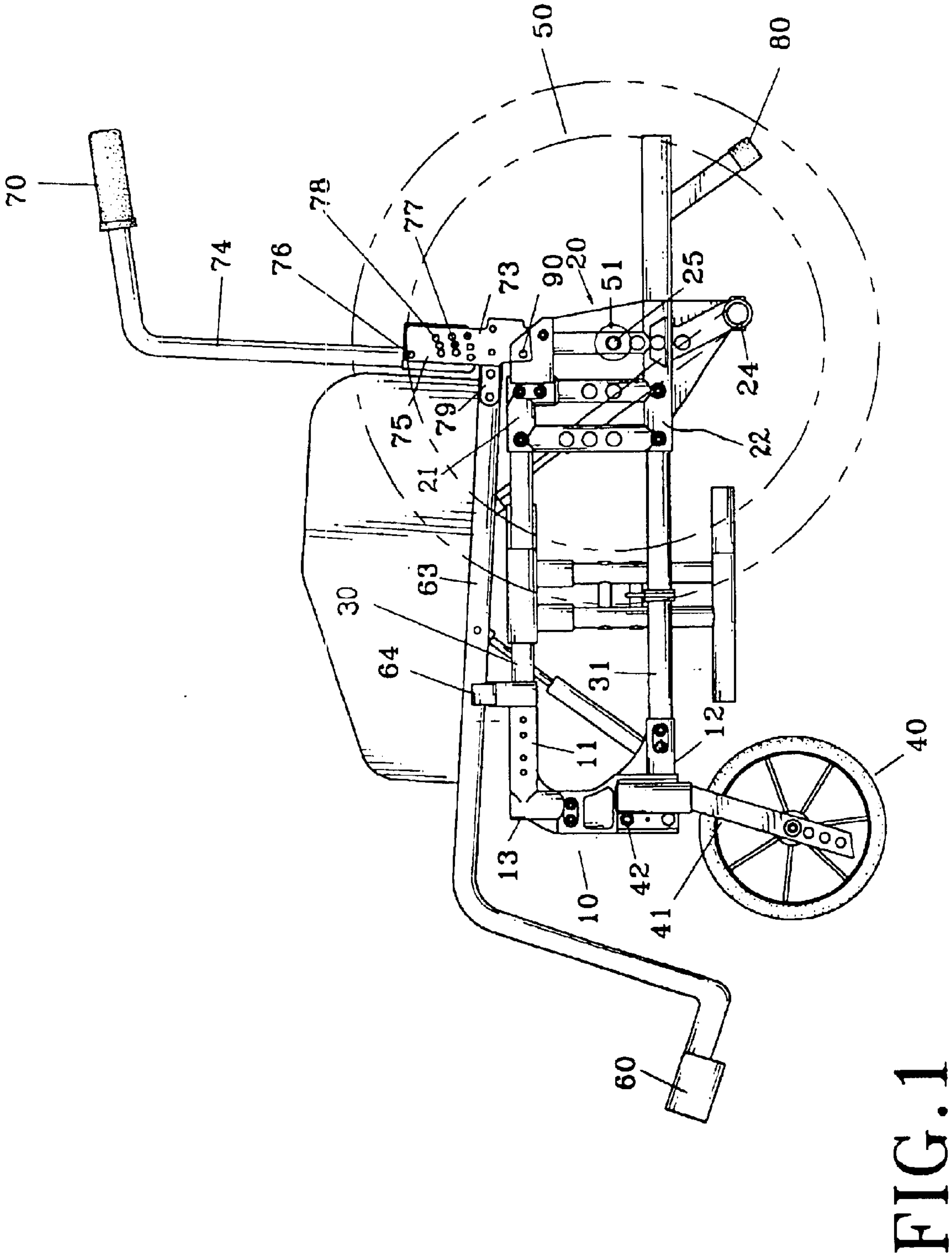
FIG. 1 is a side view of a full-function modularized assembly structure of a wheelchair in accordance with a first embodiment of the present invention.
Figure 2:
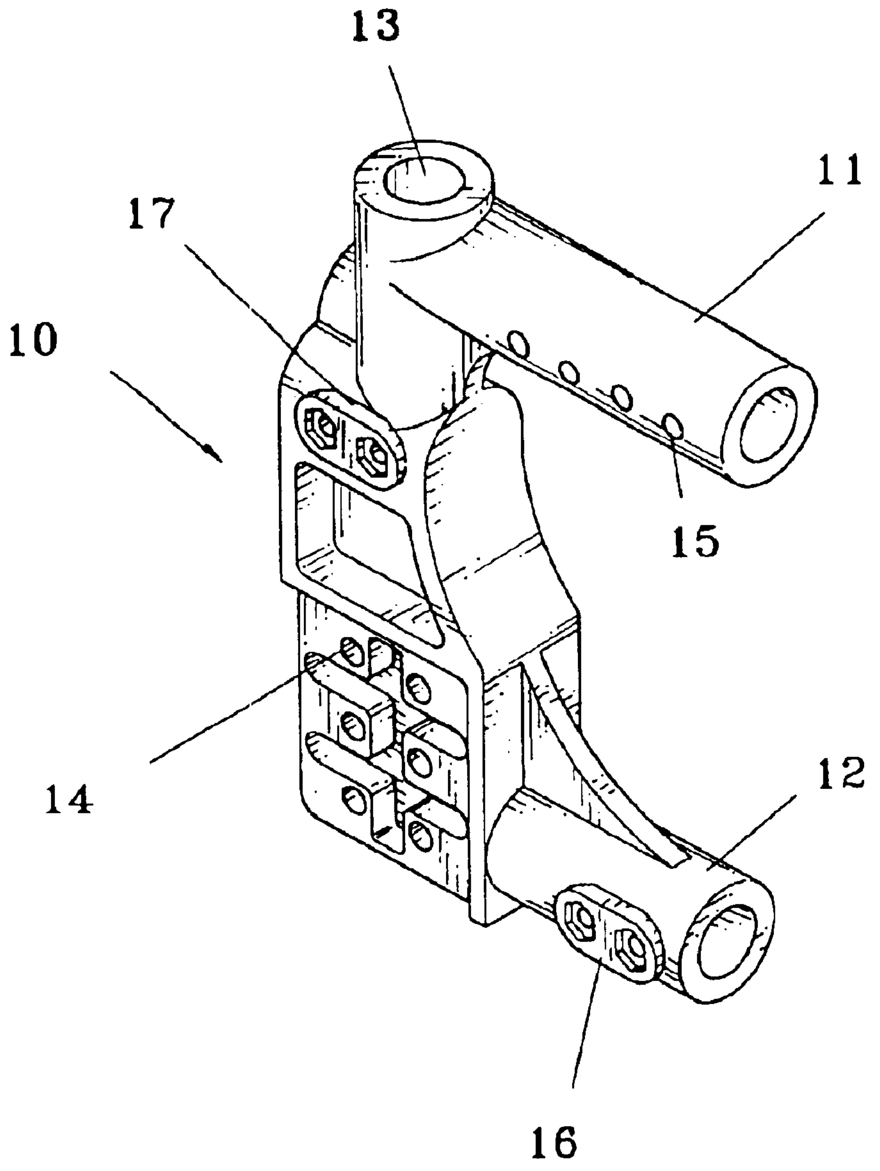
FIG. 2 is a perspective view of a sided front module connecting member of the full-function modularized assembly structure of a wheelchair in accordance with the first embodiment of the present invention.
Figure 3:
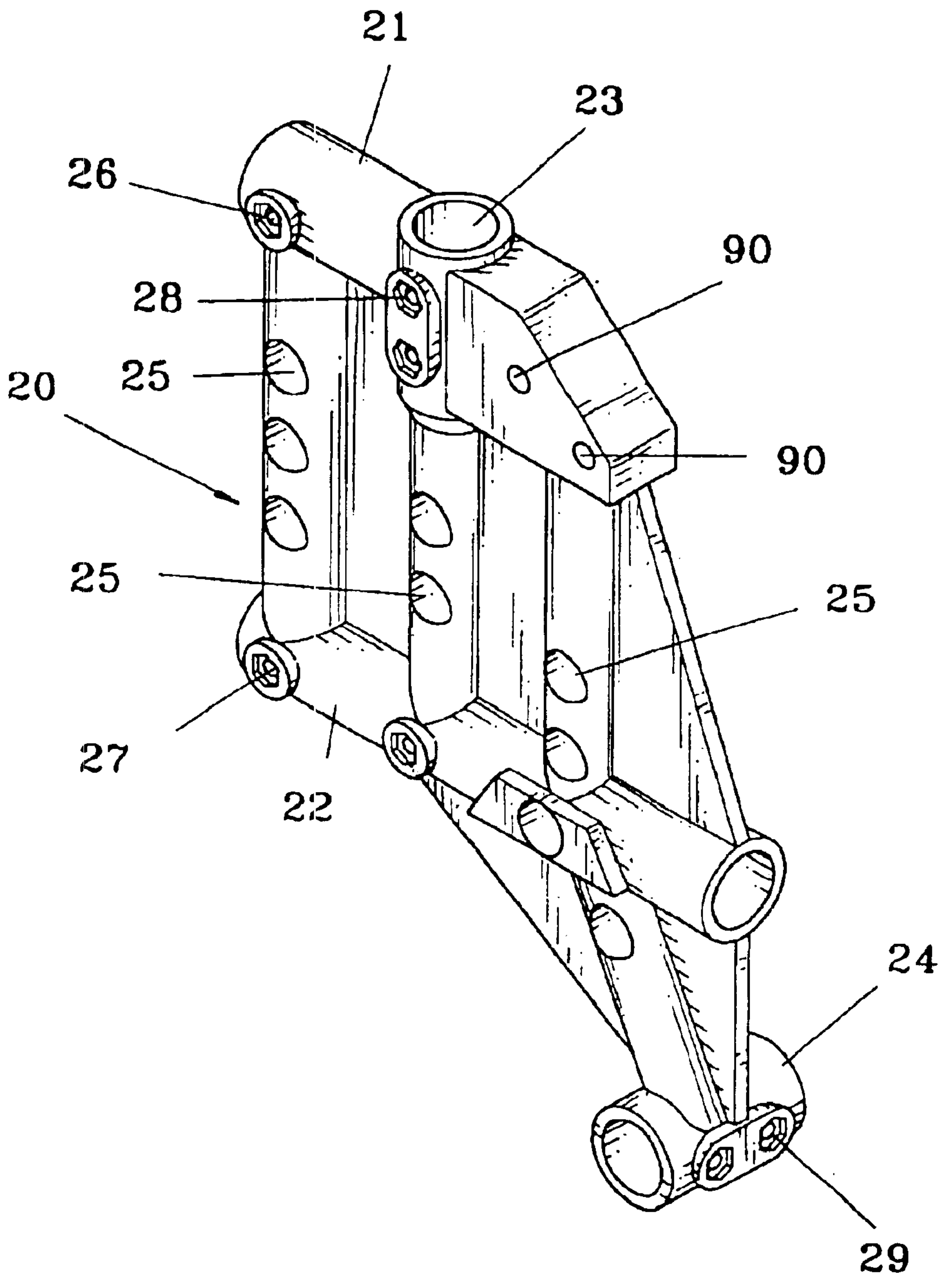
FIG. 3 is a perspective view of a sided rear module connecting member of the full-function modularized assembly structure of a wheelchair in accordance with the first embodiment of the present invention.

Referring to the drawings and initially to FIGS. 1–3, a full-function modularized assembly structure of a wheelchair in accordance with a first embodiment of the present invention comprises a pair of sided front module connecting members 10 each formed by a plastic injection molding process or other working process, and a pair of sided rear module connecting members 20 each formed by a plastic injection molding process or other working process. The sided front module connecting members 10 and the sided rear module connecting members 20 may be used to connect upper transverse tubes 30, lower transverse tubes 31, front wheels 40, rear wheels 50, foot plates 60, push bars 70, and kickstands 80 in a replaceable manner, thereby forming the main frame of the wheelchair.

Referring to FIGS. 1 and 2, each of the two sided front module connecting members 10 is substantially U-shaped, and includes a first insertion connector 11 located at a top end and extended in a horizontal direction, a second insertion connector 12 located at a bottom end and extended in a horizontal direction, a third insertion connector 13 located at the top end and extended in a vertical direction, and multiple front wheel locating screw bores 14 located at the bottom end. The multiple front wheel locating screw bores 14 are arranged at different horizontal positions and different vertical heights.

Each of the upper transverse tubes 30 is selectively inserted into the first insertion connector 11. Each of the lower transverse tubes 31 is selectively inserted into the second insertion connector 12. A foot plate extension bracket 62 (see FIG. 8) has a first end selectively inserted into the third insertion connector 13, and a second end provided with a foot plate 61. Each of the front wheels 40 is rotatably mounted on a front fork 41 which is selectively locked on one of the multiple front wheel locating screw bores 14 by a locking member 42 (such as a bolt). The positions of the front fork 41 may be set to accommodate the diameter and type of the front wheel 40.

In addition, the first insertion connector 11 is formed with at least one radial screw bore 15 for receiving a retaining bolt (not shown), so as to retain the member inserted into the first insertion connector 11. Similarly, the second insertion connector 12 is formed with at least one radial screw bore 16 for receiving a retaining bolt (not shown), so as to retain the member inserted into the second insertion connector 12. Similarly, the third insertion connector 13 is formed with at least one radial screw bore 17 for receiving a retaining bolt (not shown), so as to urge retain the member inserted into the third insertion connector 13.

Referring to FIGS. 1 and 3, each of the two sided rear module connecting members 20 includes a fourth insertion connector 21 located at a top end and extended in a horizontal direction, a fifth insertion connector 22 located at a bottom end and extended in a horizontal direction, a sixth insertion connector 23 located at the top end and extended in a horizontal direction, a seventh insertion connector 24 located at the bottom end under the fifth insertion connector 22 and extended in a horizontal direction, and multiple rear wheel axle insertion holes 25. The multiple rear wheel axle insertion holes 25 are arranged at different horizontal positions and different vertical heights.

The fourth insertion connector 21 is corresponding to the first insertion connector 11 of each of the two sided front module connecting members 10, so that each of the upper transverse tubes 30 is selectively inserted into the fourth insertion connector 21. The fifth insertion connector 22 is corresponding to the second insertion connector 12, so that each of the lower transverse tubes 31 is selectively inserted into the fifth insertion connector 22. In certain alternate embodiments, a push bar extension bracket 72, in a manner similar to that shown in (FIG. 8,) may have a first end selectively inserted into the sixth insertion connector 23, and a second end provided with a push bar 71. Each of the kickstands 80 is selectively inserted into the seventh insertion connector 24. Each of the rear wheels 50 is mounted on a rear wheel axle 51 which is selectively locked in one of the multiple rear wheel axle insertion holes 25.

In addition, the fourth insertion connector 21 is formed with at least one radial screw bore 26 for screwing an urging bolt (not shown), so as to urge the member inserted into the fourth insertion connector 21. Similarly, the fifth insertion connector 22 is formed with at least one radial screw bore 27 for screwing an urging bolt (not shown), so as to urge the member inserted into the fifth insertion connector 22. Similarly, the sixth insertion connector 23 is formed with at least one radial screw bore 28 for screwing an urging bolt (not shown), so as to urge the member inserted into the sixth insertion connector 23. Similarly, the seventh insertion connector 24 is formed with at least one radial screw bore 29 for screwing an urging bolt (not shown), so as to urge the member inserted into the seventh insertion connector 24.

Figure 4:
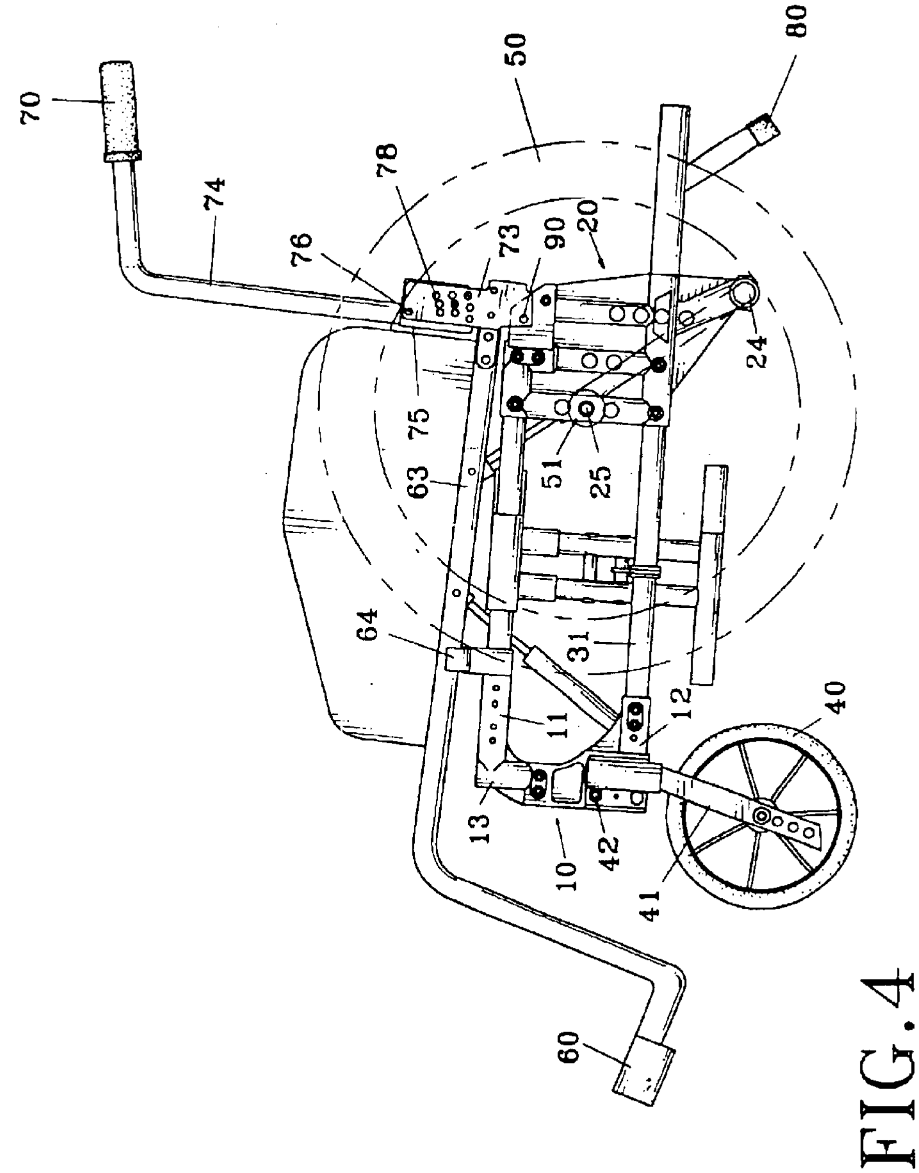
FIG. 4 is a side view of a full-function modularized assembly structure of a wheelchair in accordance with the first embodiment of the present invention, wherein the rear wheel is closer to the front wheel.

As shown in FIGS. 1 and 4, the rear wheel axle 51 of each of the rear wheels 50 may be selectively locked in one of the multiple rear wheel axle insertion holes 25. Thus, the rear wheel axle 51 of each of the rear wheels 50 may be located at different horizontal positions. Thus, the distance between the rear wheel 50 and the front wheel 40 may be changed and adjusted, wherein the distance between the rear wheel 50 and the front wheel 40 may be increased for enhancing the stability of the wheelchair, and the distance between the rear wheel 50 and the front wheel 40 may be shortened, thereby facilitating the user operating the rear wheel 50 to travel forward. In addition, the rear wheel axle 51 of each of the rear wheels 50 may be located at different vertical heights, so that the present invention is available for wheelchairs of different sizes.

Figure 5:
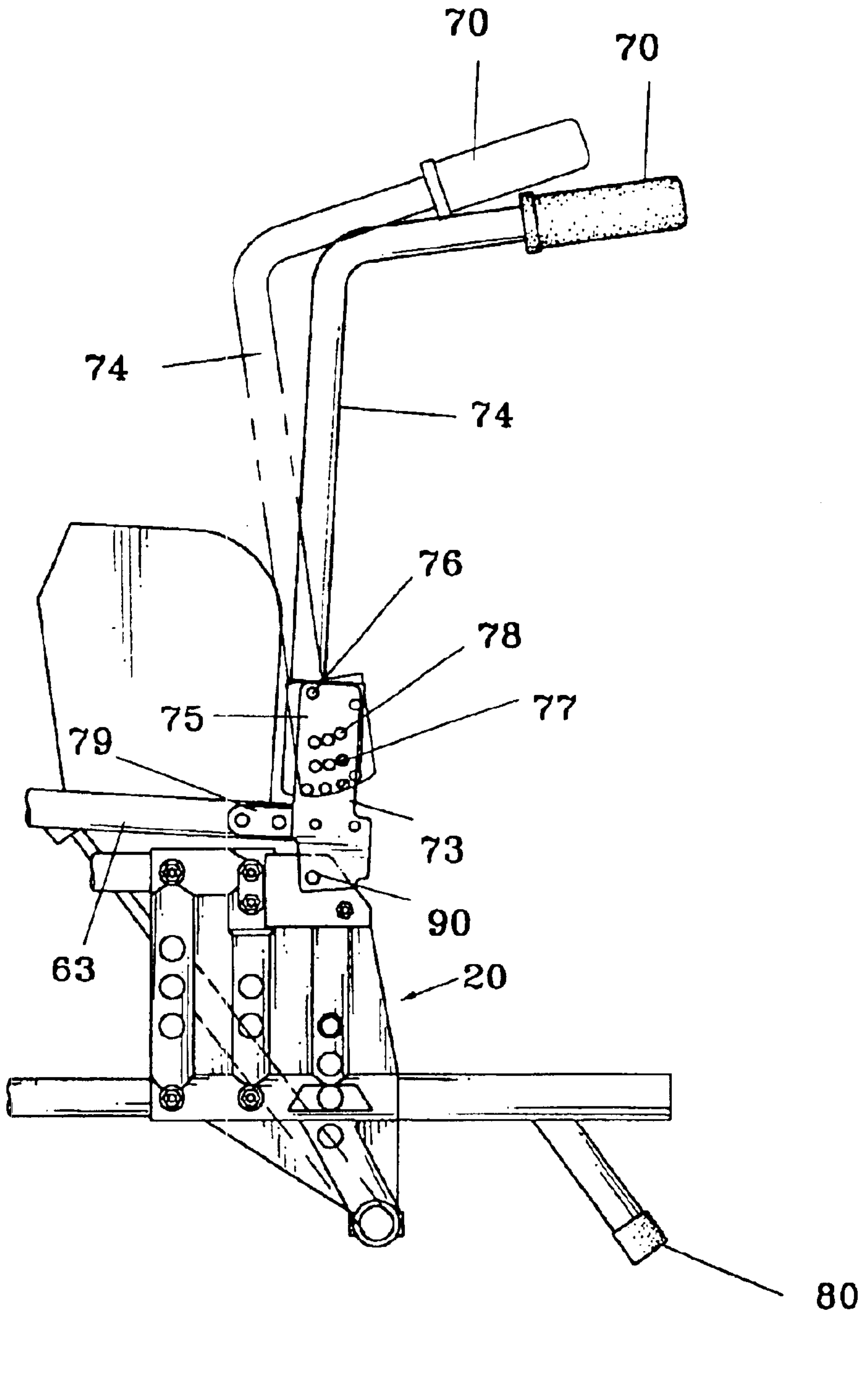
FIG. 5 is a partially cut-away enlarged view of the full-function modularized assembly structure of a wheelchair as shown in FIG. 1.

Referring to FIGS. 1 and 5, each of the two sided rear module connecting members 20 is formed with at least one pin hole 90, so that a handle structure may be selectively and pivotally mounted on the pin hole 90 by a pin.

The handle structure includes a pivotable connecting seat 73 having a bottom pivotally mounted on the pin hole 90, and a push bar extension bracket 74 mounted on the connecting seat 73. The connecting seat 73 is formed with multiple pin holes 78. The push bar extension bracket 74 has a first end provided with a push bar 70 and a second end provided with a block 75. The block 75 of the push bar extension bracket 74 has a top pivotally mounted on a top of the connecting seat 73 by a spindle 76, and a bottom for insertion of a fixing pin 77 which is selectively inserted into one of the multiple pin holes 78 of the connecting seat 73. Thus, the inclined angle of the block 75 of the push bar extension bracket 74 may be changed by changing the insertion positions of the fixing pin 77, so as to change the inclined angle of the push bar 70 relative to the connecting seat 73 as shown in FIG. 5, thereby facilitating the push bar 70 pushing the wheelchair.

The connecting seat 73 has a front end provided with a fixing lug 79. A foot plate extension bracket 63 (see FIG. 1)

has a first end locked on the fixing lug 79 of the connecting seat 73, and a second end provided with a foot plate 60. A pad 64 is secured on the upper transverse tube 30 for supporting the foot plate extension bracket 63.

Figure 6:
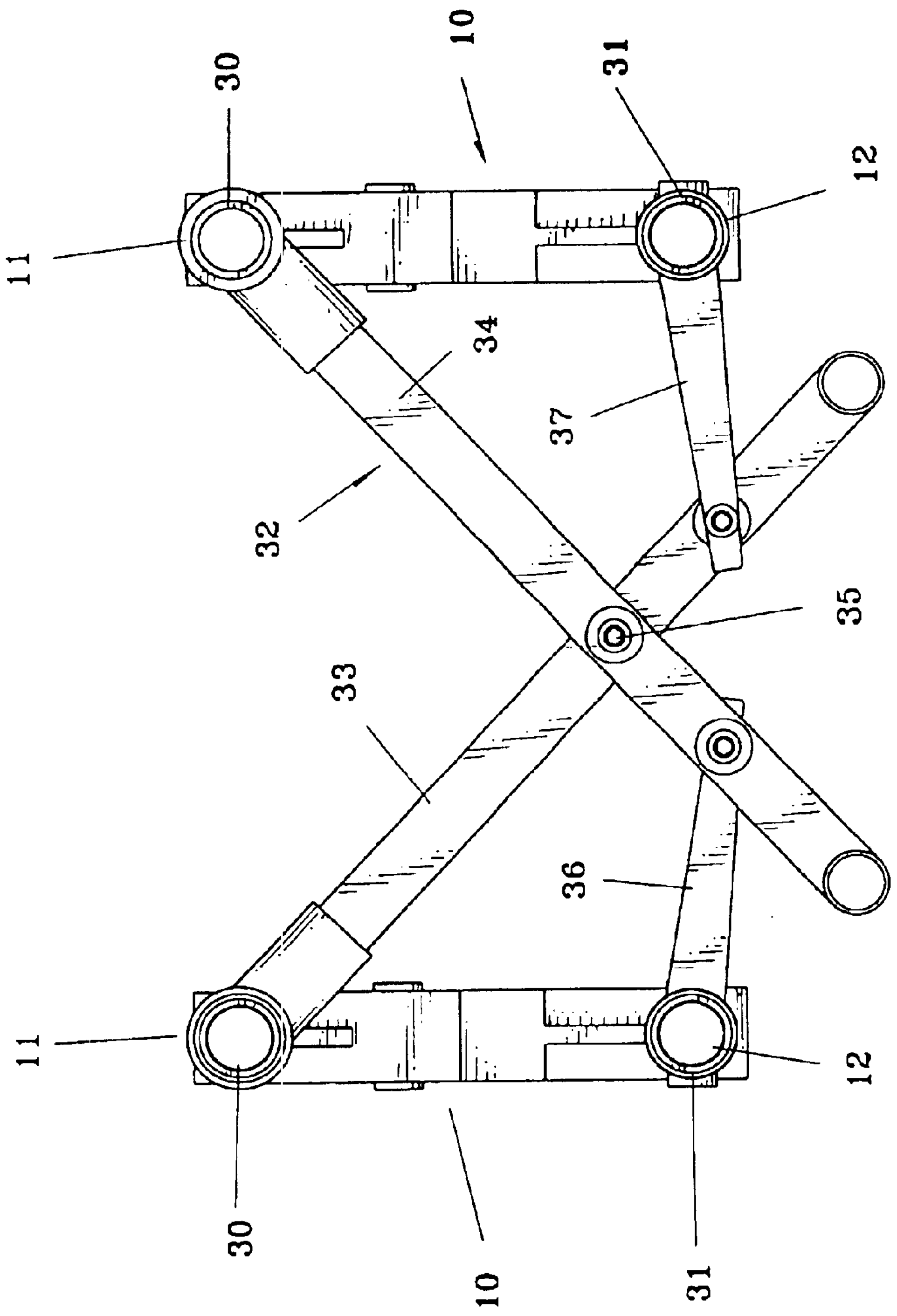
FIG. 6 is a front view of the full-function modularized assembly structure of a wheelchair as shown in FIG. 1.
Figure 7:
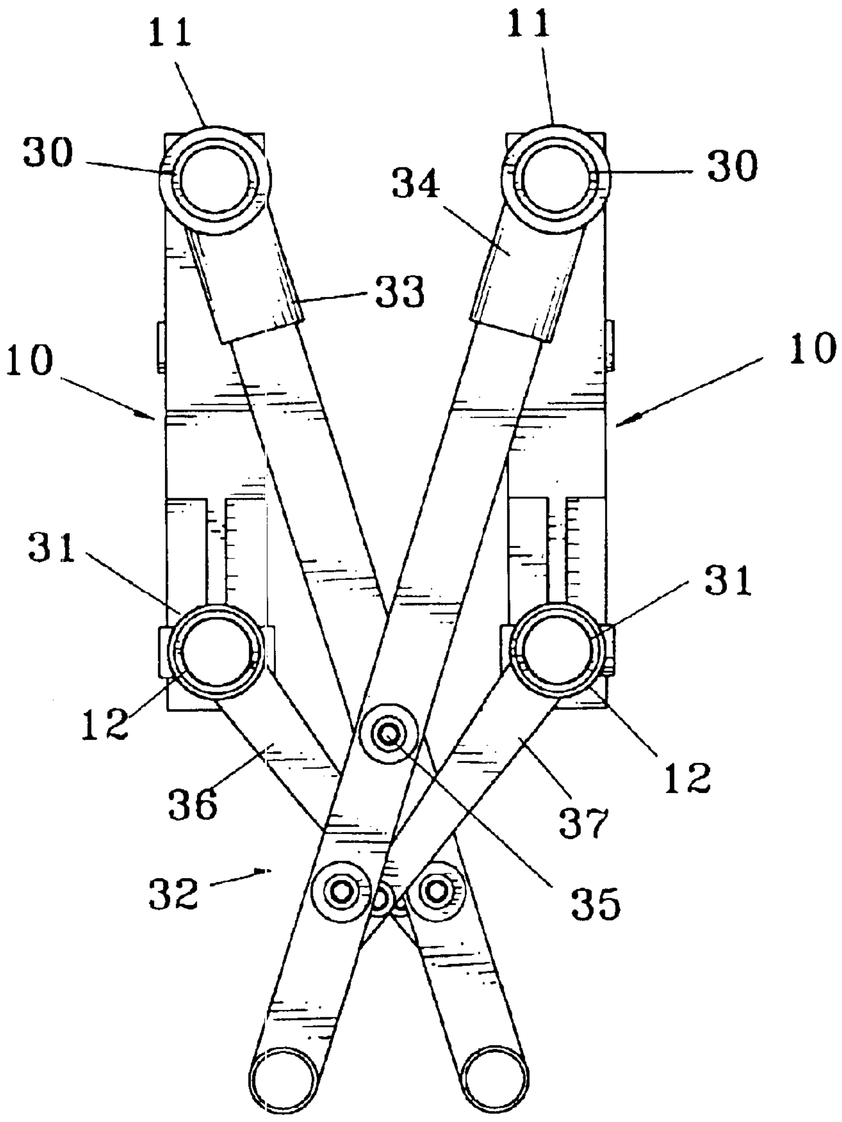
FIG. 7 is a folded view of the full-function modularized assembly structure of a wheelchair as shown in FIG. 6.

Referring to FIGS. 6 and 7, the main frame of the wheelchair includes two upper transverse tubes 30 mounted between the two sided front module connecting members 10 and the two sided rear module connecting members 20, two lower transverse tubes 31 mounted between the two sided front module connecting members 10 and the two sided rear module connecting members 20, and a radial connecting set 32 connecting the two upper transverse tubes 30 and the two lower transverse tubes 31.

The radial connecting set 32 may be folded and expanded, and includes a first radial connecting lever 33 having a first end pivotally mounted on one of the two upper transverse tubes 30, a second radial connecting lever 34 pivotally connected with the first radial connecting lever 33 by a spindle 35 and having a first end pivotally mounted on the other of the two upper transverse tubes 30, a third radial connecting lever 36 having a first end pivotally mounted on one of the two lower transverse tubes 31 and a second end pivotally mounted on a second end of the second radial connecting lever 34, and a fourth radial connecting lever 37 having a first end pivotally mounted on the other of the two lower transverse tubes 31 and a second end pivotally mounted on a second end of the first radial connecting lever 33.

Thus, when the wheelchair is not in use, the radial connecting set 32 may be disposed at a folded status as shown in FIG. 7, so as to shorten the volume of the wheelchair, thereby facilitating storage of the wheelchair.

Figure 8:
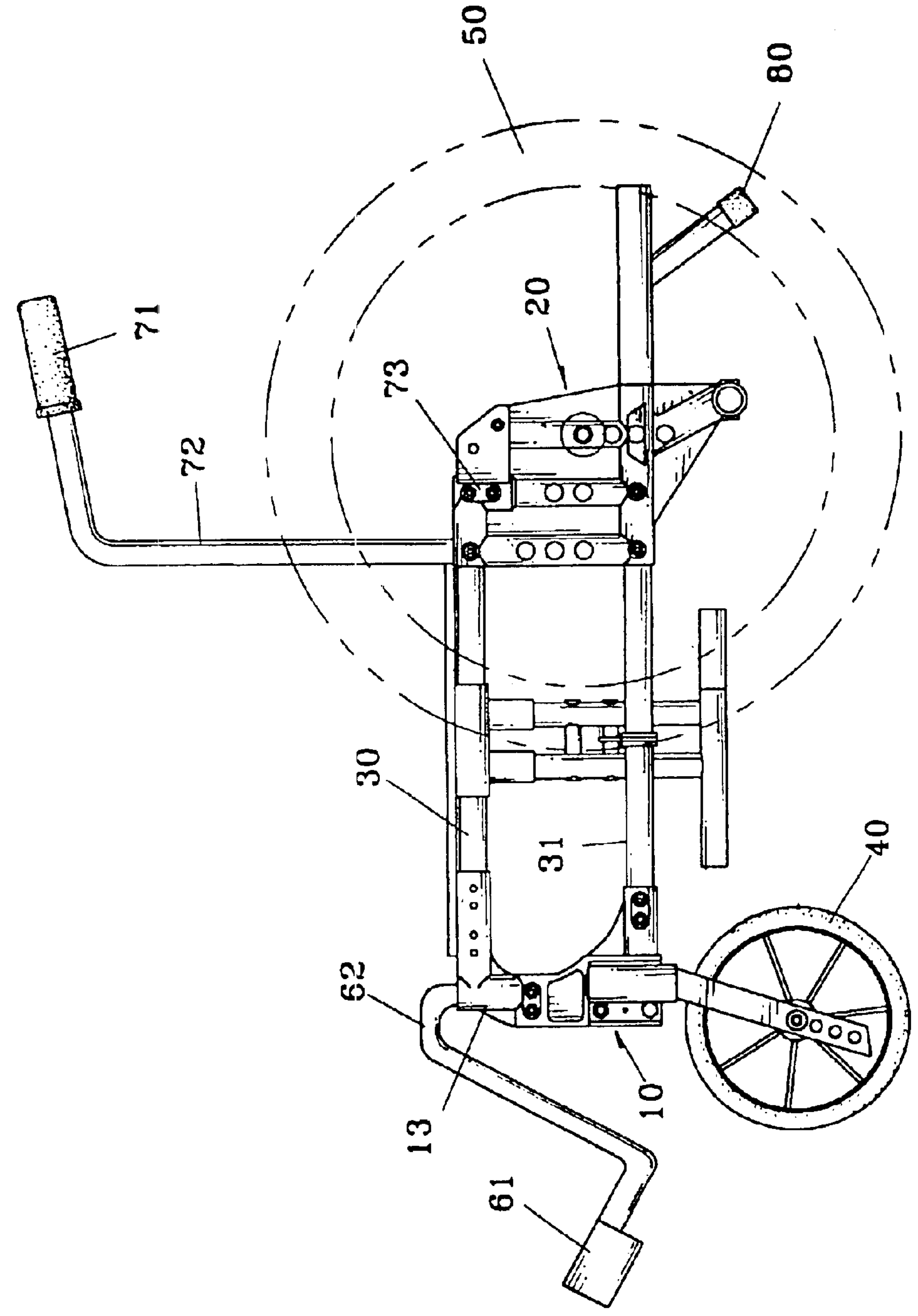
FIG. 8 is a side view of a full-function modularized assembly structure of a wheelchair in accordance with a second embodiment of the present invention.

Referring to FIG. 8, a full-function modularized assembly structure of a wheelchair in accordance with a second embodiment of the present invention is shown.

In assembly, the foot plate extension bracket 62 has a first end selectively inserted into the third insertion connector 13 of each of the sided front module connecting members 10 and a second end provided with a foot plate 61. In addition, the push bar extension bracket 72 has a first end selectively inserted into the sixth insertion connector 23 of each of the sided rear module connecting members 20, and a second end provided with a push bar 71. Further, the length of each of the two upper transverse tubes 30 and each of the two lower transverse tubes 31 and the diameter of each of the front wheels 40 and each of the rear wheels 50 may be changed according to the user's practical requirements, thereby constructing wheelchairs of different sizes and specifications.

Figure 9:
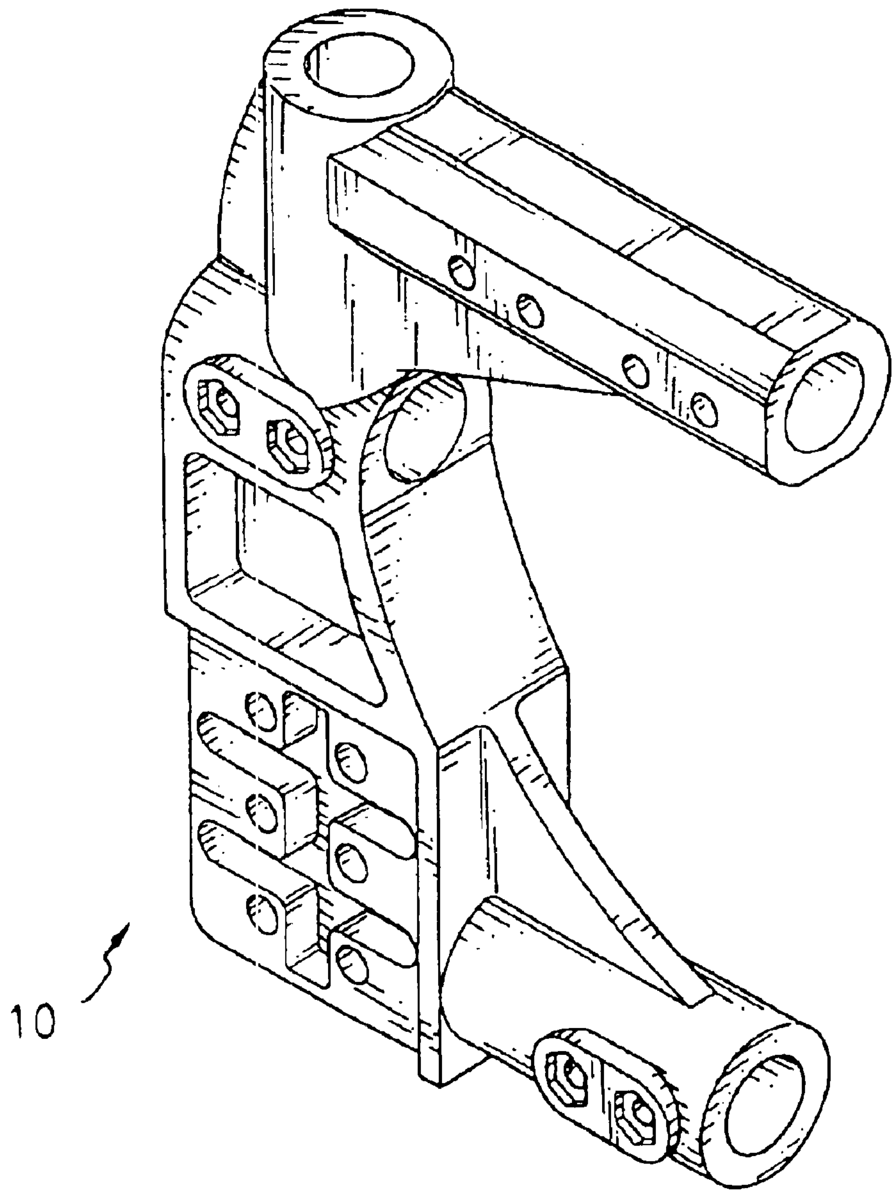
FIG. 9 is a perspective view of a sided front module connecting member of the full-function modularized assembly structure of a wheelchair in accordance with another embodiment of the present invention.
Figure 10:
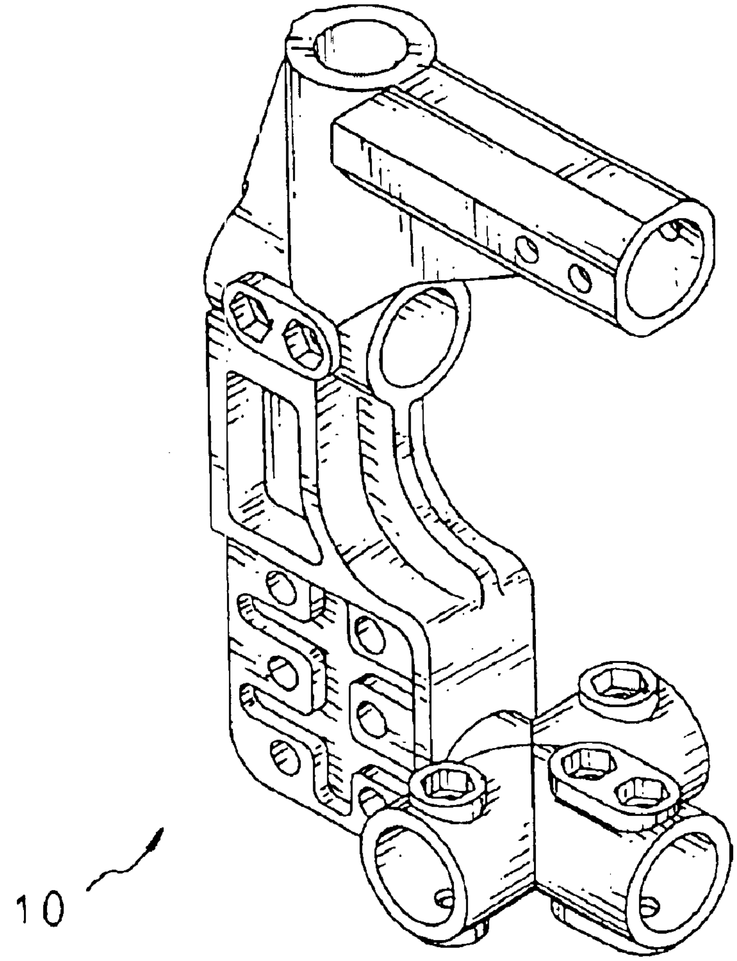
FIG. 10 is a perspective view of a sided front module connecting member of the full-function modularized assembly structure of a wheelchair in accordance with another embodiment of the present invention.

Referring to FIGS. 9 and 10, each of the two sided front module connecting members 10 has a different configuration or shape.

Figure 11:
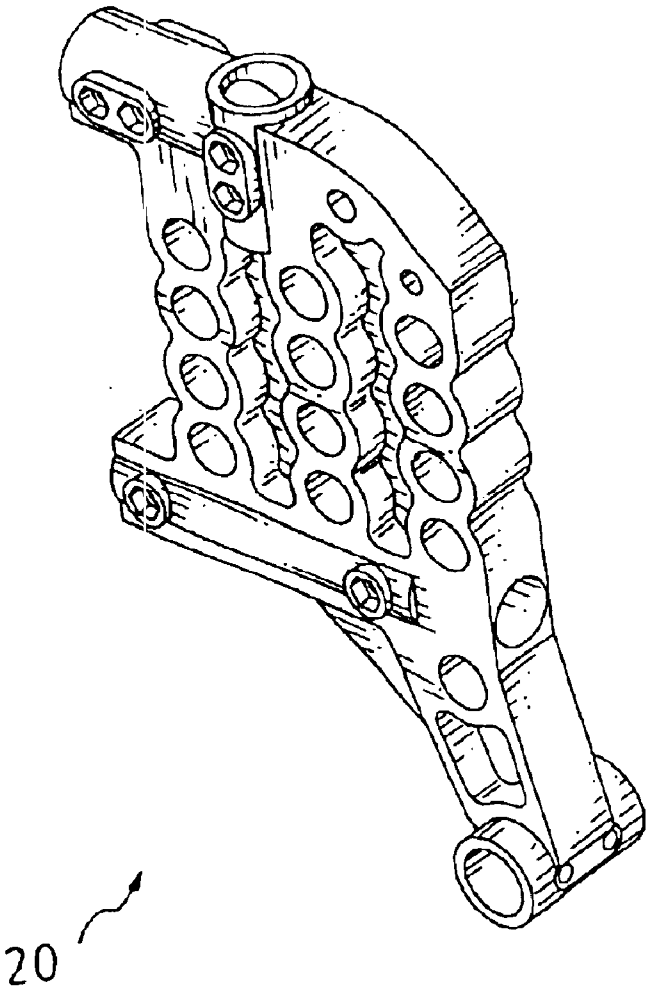
FIG. 11 is a perspective view of a sided rear module connecting member of the full-function modularized assembly structure of a wheelchair in accordance with another embodiment of the present invention.
Figure 12:
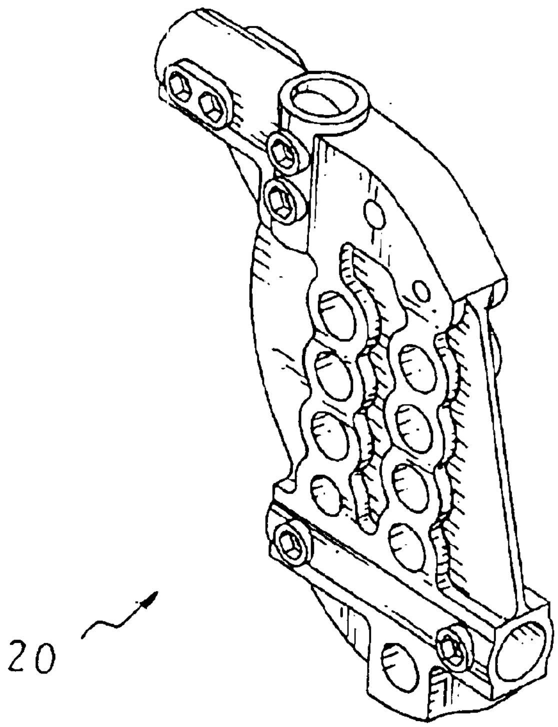
FIG. 12 is a perspective view of a sided rear module connecting member of the full-function modularized assembly structure of a wheelchair in accordance with another embodiment of the present invention.

Referring to FIGS. 11 and 12, each of the two sided rear module connecting members 20 has a different configuration or shape.

Figure 13:
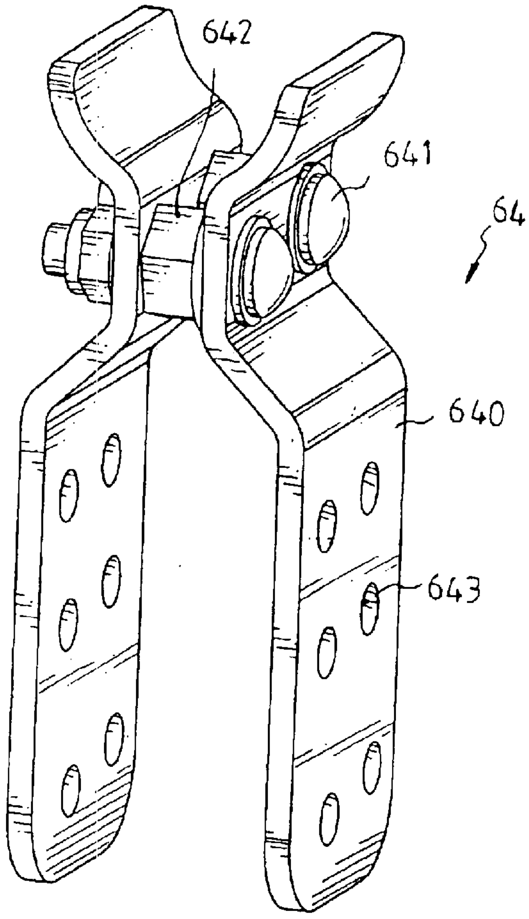
FIG. 13 is a perspective view of a pad of the full-function modularized assembly structure of a wheelchair in accordance with another embodiment of the present invention.

Referring to FIG. 13, in accordance with another embodiment of the present invention, the pad 64 includes two connecting pieces 640 connected with each other by bolts 641 and nuts 642, thereby forming a substantially Y-shaped structure for supporting the foot plate extension bracket 63 (see FIG. 1). Each of the two connecting pieces 640 is formed with multiple locking holes 643 for locking each of the two upper transverse tubes 30.

Figure 14:
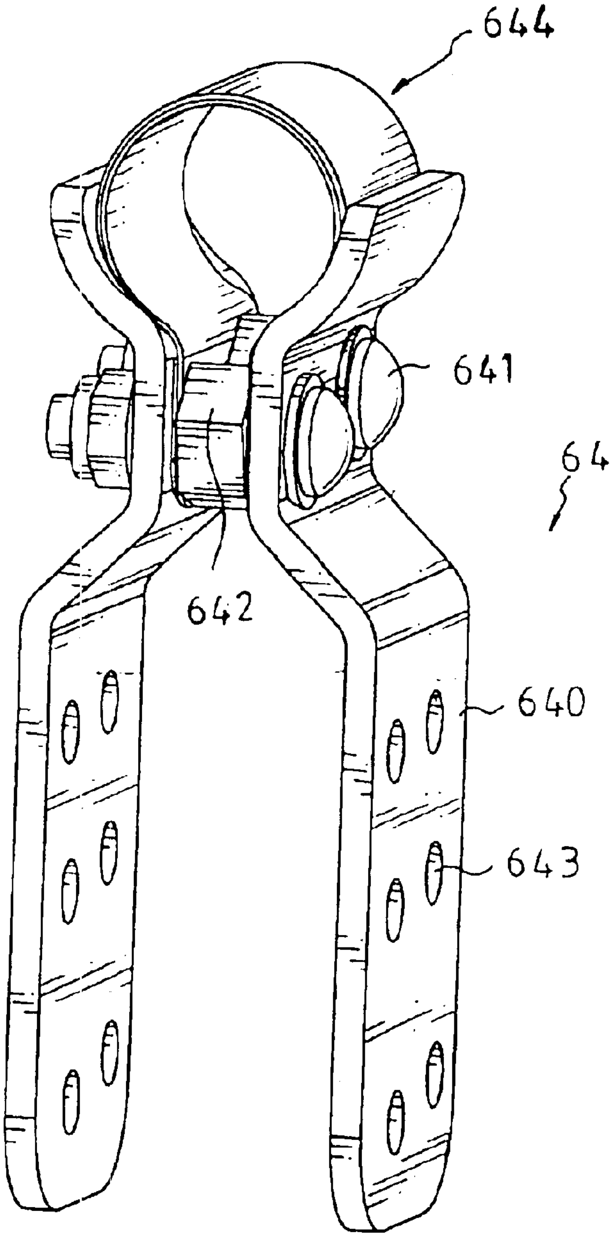
FIG. 14 is a perspective view of a pad of the full-function modularized assembly structure of a wheelchair in accordance with another embodiment of the present invention.

Referring to FIG. 14, in accordance with another embodiment of the present invention, the pad 64 further includes a loop-shaped cover member 644 for supporting and retaining the foot plate extension bracket 63 (see FIG. 1).

Accordingly, the full-function modularized assembly structure of a wheelchair in accordance with the present invention has the following advantages.

1. The sided front module connecting members 10 and the sided rear module connecting members 20 may mate with the upper transverse tubes 30 and the lower transverse tubes 31 of different sizes and types according to the user's practical requirements, thereby constructing wheelchairs of different sizes and specifications.

2. The rear wheel axle 51 of each of the rear wheels 50 may be located at different horizontal positions, so that the distance between the rear wheel 50 and the front wheel 40 may be changed and adjusted arbitrarily, wherein the distance between the rear wheel 50 and the front wheel 40 may be increased for enhancing the stability of the wheelchair, and the distance between the rear wheel 50 and the front wheel 40 may be shortened, thereby facilitating the user operating the rear wheel 50 to travel forward.

3. The rear wheel axle 51 of each of the rear wheels 50 may be located at different vertical heights, so that the present invention is available for wheelchairs of different sizes.

4. The full-function modularized assembly structure has a simple construction, and may be produced in a modularized manner, thereby efficiently decreasing costs of fabrication.

Although the invention has been explained in relation to its preferred embodiment as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A modularized assembly structure of a wheelchair, comprising:

a pair of sided front module connecting members each including a first insertion connector for insertion of an upper transverse tube, a second insertion connector for insertion of a lower transverse tube, and at least one front wheel locating screw bore for locating a front wheel; and, a pair of sided rear module connecting members each including a fourth insertion connector corresponding to the first insertion connector for insertion of the upper transverse tube, a fifth insertion connector corresponding to the second insertion connector for insertion of a lower transverse tube, and at least one rear wheel axle insertion hole for insertion of a rear wheel axle;

wherein each of the sided front module connecting members has multiple front wheel locating screw bores which are arranged at different horizontal positions and different vertical heights, and the front wheel is selectively located by one of the multiple front wheel locating screw bores.

2. A modularized assembly structure of a wheelchair, comprising:

a pair of sided front module connecting members each including a first insertion connector for insertion of an upper transverse tube, a second insertion connector for insertion of a lower transverse tube, and at least one front wheel locating screw bore for locating a front wheel; and, a pair of sided rear module connecting members each including a fourth insertion connector corresponding to the first insertion connector for insertion of the upper transverse tube, a fifth insertion connector corresponding to the second insertion connector for insertion of a lower transverse tube, and at least one rear wheel axle insertion hole for insertion of a rear wheel axle;

wherein each of the sided rear module connecting members is formed with at least one pin hole, so that a handle structure may be selectively and pivotally mounted on the pin hole by a pin.

3. The modularized assembly structure of a wheelchair in accordance with claim 2, wherein the handle structure includes a pivotable connecting seat having a bottom mounted on one of the sided rear module connecting members, and a push bar extension bracket mounted on the connecting seat, the connecting seat is formed with a plurality of pin holes, the push bar extension bracket has a first end provided with a push bar and a second end provided with a block, the block of the push bar extension bracket has a top pivotally mounted on a top of the connecting seat by a spindle, and a bottom for insertion of a fixing pin which is selectively inserted into one of the pin holes of the connecting seat.

4. The modularized assembly structure of a wheelchair in accordance with claim 3, wherein the connecting seat has a front end provided with a fixing lug for locking a first end of a foot plate extension bracket whose second end is provided with a foot plate, and a pad is secured on the upper transverse tube for supporting the foot plate extension bracket.

5. A modularized assembly structure of a wheelchair, comprising:

a pair of sided front module connecting members each including a first insertion connector for insertion of an upper transverse tube, a second insertion connector for insertion of a lower transverse tube, at least one front wheel locating screw bore for locating a front wheel, a pad mounted on the upper transverse tube; and, a pair of sided rear module connecting members each including a fourth insertion connector corresponding to the first insertion connector for insertion of the upper transverse tube, a fifth insertion connector corresponding to the second insertion connector for insertion of a lower transverse tube, and at least one rear wheel axle insertion hole for insertion of a rear wheel axle;

wherein the pad includes two connecting pieces connected with each other by bolts and nuts, thereby forming a substantially Y-shaped structure, and each of the two connecting pieces is formed with multiple locking holes for locking the upper transverse tube.

6. A modularized assembly structure of a wheelchair, comprising:

a pair of sided front module connecting members each including a first insertion connector for insertion of an upper transverse tube, a second insertion connector for insertion of a lower transverse tube, at least one front wheel locating screw bore for locating a front wheel, a pad mounted on the upper transverse tube; and, a pair of sided rear module connecting members each including a fourth insertion connector corresponding to the first insertion connector for insertion of the upper transverse tube, a fifth insertion connector corresponding to the second insertion connector for insertion of a lower transverse tube, and at least one rear wheel axle insertion hole for insertion of a rear wheel axle;

wherein the pad has a top provided with a loop-shaped cover member.

* * * * *